United States Patent [19]
Brown

[11] 3,948,469
[45] Apr. 6, 1976

[54] ENGINE MOUNTING AND BOUNDARY LAYER CONTROL FLUID SUPPLY APPARATUS

[75] Inventor: Robert B. Brown, Kent, Wash.

[73] Assignee: The Boeing Company, Seattle, Wash.

[22] Filed: Nov. 25, 1974

[21] Appl. No.: 526,706

[52] U.S. Cl.................... 244/54; 60/226 R; 244/55
[51] Int. Cl.²........................................ B64D 27/26
[58] Field of Search......... 244/54, 55, 42 CC, 53 R, 244/119, 52, 15; 248/5; 60/39.31, 226 R

[56] References Cited
UNITED STATES PATENTS

| | | | |
|---|---|---|---|
| 3,063,661 | 11/1962 | Smith | 60/39.31 X |
| 3,149,801 | 9/1964 | Wolf | 244/15 |
| 3,332,644 | 7/1967 | Whittley | 244/42 CC |
| 3,362,659 | 1/1968 | Razak | 244/54 X |
| 3,514,952 | 6/1970 | Schumacher et al. | 60/226 R X |
| 3,844,482 | 10/1974 | Stearns | 244/110 B X |
| 3,848,832 | 11/1974 | Stanley et al. | 244/54 |

FOREIGN PATENTS OR APPLICATIONS

| | | | |
|---|---|---|---|
| 667,696 | 3/1952 | United Kingdom | 244/54 |

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

A midwing aircraft employs a unique configuration for mounting three high bypass turbofan engines. All three engines are mounted so that a portion thereof projects forwardly of the leading edge of the airfoil on which they are mounted and so that the chordal plane of the airfoil longitudinally bisects the engine. The exhaust from each of the engines is directed by two nozzles. Internal bifurcators split both the turbine exhaust and the fan exhaust from each of the engines evenly between the two nozzles. A pair of channels in each of the wing mounted engines intercepts a portion of the fan effluent and directs it rearwardly into boundary layer control supply plenums in the wing structure. Valve mechanisms for opening and closing the channels are mounted in the forward portions of the channels. Check valves are also provided in each of the channels to prevent backflow of fluid from the supply plenums into the channels. The engines are mounted on the airfoils by a pair of box beams that run along the interior longitudinal sides of each of the engine nacelles. The turbine portion of the turbofan engines is mounted to the inner sides of the box beams at a location forwardly of the leading edge of the airfoils. The box beams can be shrouded to serve as the fluid inlet channels for the fluid supply plenums. The rear portion of the box beams are removably affixed to ribs or flanges extending forwardly from the front main spar of the wing.

13 Claims, 10 Drawing Figures

ENGINE MOUNTING AND BOUNDARY LAYER CONTROL FLUID SUPPLY APPARATUS

BACKGROUND OF THE INVENTION

The present invention relates to an improved apparatus for mounting jet propulsion engines on an airfoil and to a unique means for intercepting a portion of the engine generated exhaust effluent and channeling such effluent into boundary layer control supply plenums in the airfoil.

It is preferable in both commercial and military craft of the passenger or transport type to employ a midwing or low wing configuration, especially in larger aircraft, to provide structural integrity and to provide ease of access to the wing structure for refueling and maintenance. High bypass turbofan jet propulsion engines are desirably employed in such aircraft because of their relatively high thrust-to-weight and low sound level characteristics. Problems arise in mounting such turbofan engines on midwing and low wing configured aircraft because among other reasons of the relatively large diameter of such engines as compared to straight turbojet engines.

Most prior art midwing and low wing aircraft employ pod-mounted engines, i.e., engines that are mounted on struts that extend downwardly from the wing to a location below the wing. When used with midwing and low wing aircraft, pod-mounted turbofan engines do not provide adequate ground clearance under certain operating conditions and also tend to ingest foreign objects upon landing and takeoff. Moreover, prior art engine mounting struts must be relatively heavy and must be reinforced to withstand not only the normal forward thrust components but also the reverse thrust components created by thrust reversal for aircraft braking purposes upon landing. In addition, the cowl structure of pod-mounted turbofan engines must be constructed to incorporate and house the thrust reversing mechanism and to withstand the thrust loads when the reversers are in operation.

There is also a trend toward utilization of boundary layer control systems on the wings of aircraft designed to take off and land in relatively short distances. Boundary layer control systems normally employ engine exhaust effluent as the source of control fluid, which is supplied from plenums in the wing structure to slots running spanwise along the wing structure adjacent the leading edge. The exhaust effluent is fed across the surface of the wing to maintain better attachment of the ambient air stream flowing across the wing to enhance aerodynamic lift. When pod-mounted turbofan engines are utilized, the engine exhaust effluent must be channeled from the engine, up through the mounting strut, and into the boundary layer control fluid supply ducts in the wings. This additional structural requirement adds both weight and bulk, and consequently additional drag, to the aircraft.

When turbofan engines are pod-mounted on low wing and midwing aircraft, relatively long and complex retractable landing gear are required to provide sufficient ground clearance for the engines. Not only are such landing gear undesirable from the standpoint of maintenance and operation, they also add weight and additional drag to the aircraft. Moreover, long landing gear places the aircraft profile a significant distance above the ground, necessitating special loading and unloading platforms. This problem is especially significant in larger aircraft having two or more vertically spaced, deck levels.

As can be understood from the foregoing explanation, a turbofan engine mounting configuration other than conventional pod-mounting is needed for low and midwing aircraft designs. Accordingly, objects of the present invention are to provide a lightweight, low drag, engine installation for an aircraft; to provide an engine installation that allows the use of relatively short landing gear on a low or midwing aircraft; to provide an engine installation that is easily accessible for maintenance; to provide an engine mounting structure that allows the engine to be easily removed from an aircraft for major repair and replacement; to provide a turbofan jet propulsion engine installation requiring a minimum of ducting and control mechanism for supplying fan air effluent to a boundary layer control system; to provide a turbofan jet propulsion engine with boundary layer control fluid inlet ducts that are designed integrally with the engine mounting structure; to provide a means for controlling the flow of fan effluent through such boundary layer control fluid inlet ducts; to provide a means for preventing blowback of control fluid and loss of control fluid pressure through the inlet ducts; to provide a turbofan jet propulsion engine installation in which the turbine and engine cowl or nacelle are integrated with support structure, which in turn is removably mounted directly onto the airfoil; to provide such an engine installation with mounting structure having four attachment points for removably affixing a turbofan jet propulsion engine to an airfoil, and particularly to a wing; and to provide mounting structure for a turbofan jet propulsion engine wherein the engine is cantilevered forwardly of the wing and is bisected by the major chordal plane of the wing; and to provide means in such mounting structure for effectively and efficiently splitting the fan and turbine effluent into two streams and directing each of these streams on opposing sides of the airfoil on which the engine is mounted.

SUMMARY OF THE INVENTION

The foregoing objects, and other objects that will be apparent to those of ordinary skill in the art upon reading the following specification, are provided in an apparatus including a turbofan jet propulsion engine having a turbine means for generating a first propulsive gas stream and a fan means for generating a second propulsive gas stream, and an airfoil, having a span, a leading edge, a trailing edge, a chordal plane, and first and second airfoil surfaces located on opposite sides of the chordal plane. The improvement in this apparatus comprises a cowl means for enclosing and supporting the turbofan engine. The forward portion of the cowl means is positioned forwardly of the leading edge of the airfoil, while the rearward portion is fixed to the airfoil in a manner such that the cowl means is bisected by the chordal plane of the wing. The turbofan engine is mounted in the forward portion of the cowl means. An annularly shaped fan duct is formed by the inner surface of the cowl and the outer surface of the turbine. The rear portion of the cowl means terminates in first and second exhaust nozzles, the first of which is positioned on one side of the airfoil for directing a portion of the fan effluent rearwardly and chordwise across the first airfoil surface, and the second of which is positioned on the other side of the airfoil for directing a portion of the fan effluent rearwardly and chordwise across the second airfoil surface. A turbine nozzle means is coupled to the turbine for receiving the turbine exhaust effluent, bifurcating the turbine effluent into first and second portions, and directing these portions through respective ones of the first and second fan exhaust nozzles.

In another aspect of the invention, an auxiliary duct is provided in the cowl means and is positioned such that its inlet is located rearwardly of the fan means to receive a portion of the fan effluent. The auxiliary duct extends rearwardly from the inlet toward the airfoil on which the cowl is mounted and is in fluid communication with a boundary layer control fluid supply plenum in the airfoil. Means are provided to open and close the inlet to the auxiliary duct to selectively control the supply of boundary layer control fluid to the supply plenum. Additionally, means are provided in the duct to prevent backflow of boundary layer control fluid through the auxiliary duct from the plenum should the pressure in the supply plenum become greater than the pressure rearward of the fan means. Another aspect of the invention includes the provision of a box beam structure that is mounted to the airfoil and cantilevers both the cowl means and the turbine means forwardly of the airfoil. In the preferred embodiment the auxiliary boundary layer control fluid supply duct is incorporated into the box beam structure.

BRIEF DESCRIPTION OF THE DRAWINGS

A better understanding of the present invention can be derived by reading the ensuing specification in conjunction with the accompanying drawings wherein.

DESCRIPTION OF THE PREFERRED EMBODIMENT

Figure 1:
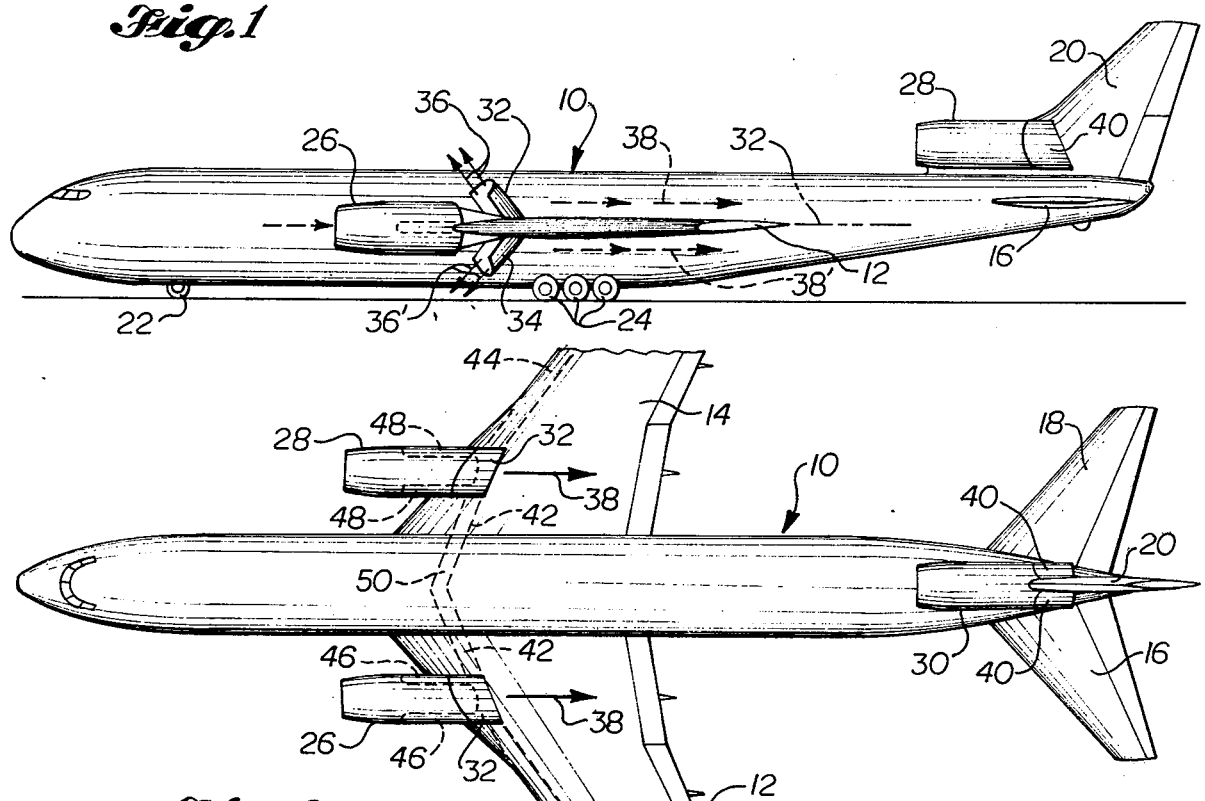
FIG. 1 is a side view of an aircraft employing the engine configuration, mounting structure, and boundary layer control fluid supply system of the present invention.
Figure 2:
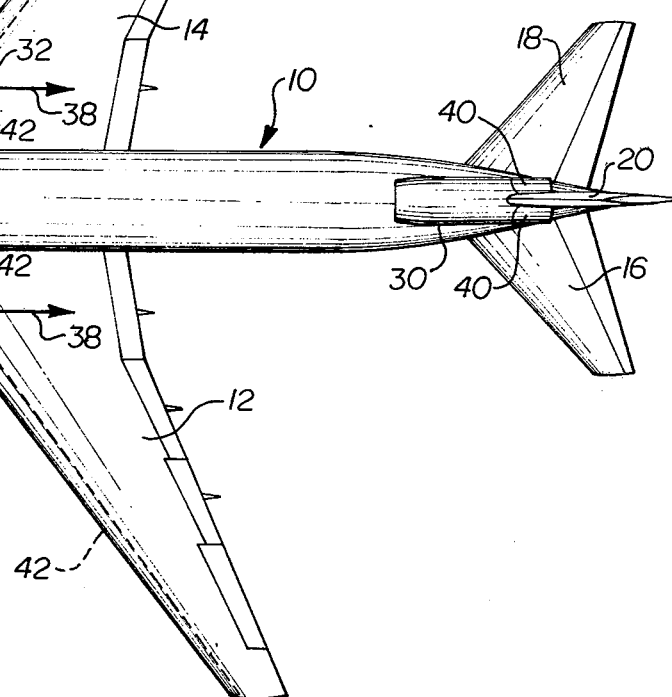
FIG. 2 is a partial plan view of the aircraft illustrated in FIG. 1.

Referring first to FIGS. 1 and 2, an aircraft 10 has left and right wings, 12 and 14 respectively, mounted centrally and in the mid portion of the fuselage, left and right horizontal stabilizers, 16 and 18 respectively, and a vertical stabilizer 20. The aircraft rests on the ground on suitable nose landing gear 22 and main gear 24. Three engines 26, 28 and 30 are mounted on the aircraft. The left or port engine 26 is mounted on the inboard portion of the left wing 12 adjacent the fuselage of the aircraft 10. The right or starboard engine 28 is mounted on the inboard portion of the right wing 14 adjacent the fuselage of the aircraft 10. The left and right engines 26 and 28 are spaced at equal distances outboard from the longitudinal center line of the aircraft 10 and are mounted on the wings such that the engine structure is bisected by the chordal plane (represented by dot-dash line 32) of the wings. By bisected it is not meant that the engine structure is necessarily divided into two equal halves, but that at least a portion of the engine structure is intersected by the chordal plane. In the preferred embodiment, the engine structure is divided into two substantially equal, upper and lower, portions by the chordal plane.

The rearward portions of the engines terminate in exhaust nozzle structures which open rearwardly onto the airfoil surfaces of the wings. The exhaust from the engines is bifurcated by structure, explained in detail below, such that a portion of the exhaust from the engines exits through an upper nozzle structure and a portion of the exhaust exits through a lower nozzle structure. Incorporated into these nozzle structures are upper and lower thrust reversing buckets, which, when viewed from the side, are similar to a conventional clamshell-type thrust reverser. The upper and lower thrust reversing buckets of the left engine, designated 32 and 34 respectively, are shown in the thrust reversing position in FIG. 1 and in a cruise position in FIG. 2. As will be explained in greater detail later, the thrust reversing buckets are pivotally mounted on wing structure to swing forwardly from the position shown in FIG. 1 to a cruise position wherein the thrust reversing buckets form a portion of the exhaust nozzles of the engine. In landing, take-off, and cruise modes of operation, the exhaust is directed rearwardly over the upper airfoil surface of wing 12 and under the lower airfoil surface of wing 12 along the paths indicated by arrows 38 and 38'. When the buckets 32 and 34 are in the thrust reversing position, the exhaust from the engines that normally flows over the upper airfoil surfaces of the wings 12 and 14 is diverted in an upper and forward direction along the paths indicated by arrows 36 (FIG. 1) and the exhaust normally flowing under the lower airfoil surfaces of the wings 12 and 14 is diverted by lower buckets 34 in a downward and forward direction along the paths indicated by arrows 36' (FIG. 1).

The third engine 30 is mounted above the aft portion of the fuselage of the aircraft 10 and is fixed to the vertical stabilizer 20. The air inlet of the third engine is positioned forwardly of the leading edge of the vertical stabilizer 20 while its rearward portion comprising the exhaust nozzles opens onto the left and right sides of the vertical stabilizer to direct the exhaust stream from the engine rearwardly along the sides of the vertical stabilizer. The third engine 30 is positioned so that the chordal plane of the vertical stabilizer bisects the engine 30 in a manner similar to that in which the wing chordal plane 32 bisects the wing mounted engines 26 and 28. If desired, the aft engine 30 can also be provided with stabilizer mounted, reversing buckets 40 which operate in a manner similar to the reversing buckets associated with wing mounted engines. When actuated, the thrust reversing buckets 40 on the stabilizer can pivot to a position in which they will direct the engine exhaust in a forward and outward direction relative to the longitudinal center line of the aircraft.

As indicated by the dashed lines in FIG. 2, boundary layer control fluid supply plenums or supply ducts 42 are internally located in the left and right wings 12 and 14 rearwardly of the leading edge of the wings. These ducts extend outwardly along the wings from the location of the engines 26 and 28 to the tip of the wings. These ducts communicate with a slot (not shown), which runs along the leading edge of the wing on the upper airfoil surface, to supply a thin layer of high energy fluid over the upper airfoil surfaces of the wings, resulting in enhanced aerodynamic lift, especially upon landing and takeoff. The boundary layer control fluid supply plenums, designated 42 and 44 respectively, in the left and right wings 12 and 14 are coupled to supply or inlet ducts, generally designated 46 and 48 in the left engine 26 and in the right engine 28, respectively. As will be explained in greater detail below, the inlet ducts 46 and 48 supply fan air from the turbofan engines 26 and 28 to the fluid supply plenums 42 and 44. An interconnecting duct 50, located in the wings and fuselage between the wing mounted engines, places the inlet ducts 46 of the left engine in fluid communication with the inlet ducts 48 of the right engine. The interconnecting duct 50 is provided to equalize the fluid pressure in the fluid supply plenums, and, in the event of either left or right engine failure, to supply boundary layer control fluid to the plenum on the wing carrying the unusable engine.

Figure 3:
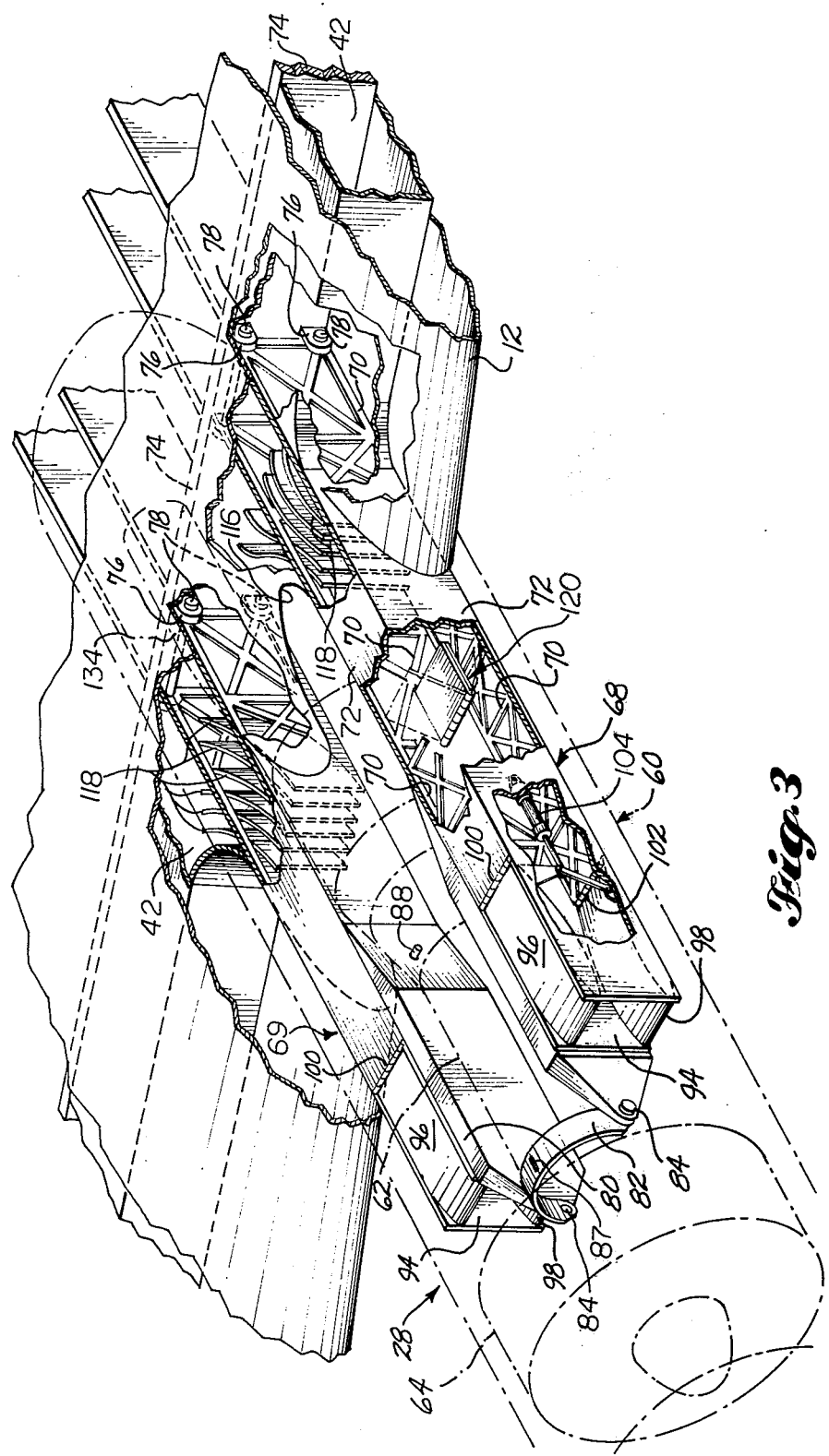
FIG. 3 is an enlarged isometric view of the mounting structure and boundary layer control fluid supply system employed with one of the wing mounted engines according to the present invention, with portions of the structure broken away and with the engine cowl and turbofan engine shown in ghost outline.

Referring to FIG. 3, an enlarged view of the left engine installation is shown. For purposes of the ensuing description, the left engine has been chosen as representative of all three engine installations, including the left and right wing mounted engines and the aft, stabilizer mounted engine. It is to be understood that the installation of the starboard wing engine 28 is a mirror image of the port engine installation shown in the ensuing figures. The installation of the aft engine 30 is substantially the same as that of the port engine 28, except that the geometry may vary due to the rearward sweep of the leading edge of the vertical stabilizer. Furthermore, no boundary layer control system is employed on the vertical stabilizer since boundary layer control is not conventionally used on vertical control surfaces but only on relatively horizontally disposed, lift generating surfaces.

The cowl 60 shown in dot-dash outline serves a dual function of forming the outer wall of an annular fan duct and housing the entire engine assembly. A turbine engine 62, which is positioned centrally within the cowl 60, is also shown in dot-dash outline. The turbine engine 62 drives a low pressure fan 64, shown in dot-dash outline, positioned in the forward portion of the cowl 60. The outer surface of the turbine 62 forms the inner wall of an annular fan duct that serves to guide the low pressure fan air generated by the fan 64 rearwardly toward the low-pressure exhaust nozzles. The turbine exhaust exits from the turbine engine 62 into a bifurcating nozzle 134 described in greater detail below.

The entire engine structure is cantilevered on the wing 12 by a pair of horizontally spaced box beams 68 and 69 that project forwardly from the wing 12. The box beams are each formed from four elongated, rectangular truss members 70, which are suitably secured together as by welding or other conventional bonding means along their longitudinal edges to form a box beam having a rectangular cross section. Four elongated panels 72 are suitably secured to the outside of the sides, top and bottom of the box beams to form a hollow rectangular channel or conduit within each of the box beams. The rearward ends of each of the box beams are secured to flanges 76 located on the forwardly facing web of the forwardmost main structural spar 74 of the wing 12. Four such flanges are provided for each box beam. The flanges are laterally spaced so that they can slidably engage the outer sides of the box beams. The flanges are vertically spaced and positioned adjacent to the upper and lower edges of the side panels near the rearward ends of the box beams. Horizontally aligned mounting holes are provided in each of the upper flanges and in the upper rearward portion of the box beams as well as in the lower flanges and the lower rearward portion of the box beams. Suitable mounting bolts 78 are inserted through the respective mutually aligned mounting holes in the flanges 76 and in the box beams to secure the box beams, and consequently the entire engine structure, to the forward main spar 74.

The longitudinal dimension of the box means extends forwardly from the front main spar 74 to a location forwardly of the leading edge of the wing 12. The box beams 68 and 69 are horizontally spaced so that the turbine 62 and the turbine exhaust nozzle can be located between the mutually opposing sidewalls of the box beams. Suitable spacing plates 80 are affixed to the forward portion of the mutually opposing sidewalls of the box beams. The forward portions of the spacing plates 80 form triangular extensions jutting forwardly of the forwardmost portion of the box beams. A suitable attachment collar 82 spans between and is secured near the apex of the triangular extensions of the spacer plates 80 by suitable mounting bolts 84. The attachment collar 82 has a semicircular configuration and surrounds the upper portion of the outer turbine wall adjacent to the compressor section of the turbine. A conventional mounting flange is located on the upper surface of the turbine housing and extends through an opening 87 provided in the upper mid portion of the attachment collar 82. The mounting flange is secured to the collar in this position by a suitable fastener. Thus the box beams 68, via the spacing plates 80 and the attachment collar 82, support the forward portion of the turbine in the space between the box beams. The rearward portion of the turbine is supported by mutually opposing mounting pins 88 that extend inwardly from the central rearward portion of the spacing plates 80 and are conventionally secured to the exterior side walls of the turbine adjacent to its combustion section. (Only one of the pins 88 can be seen in FIG. 3 while both of the pins can be seen in the plan view of FIG. 5.)

Figure 4:
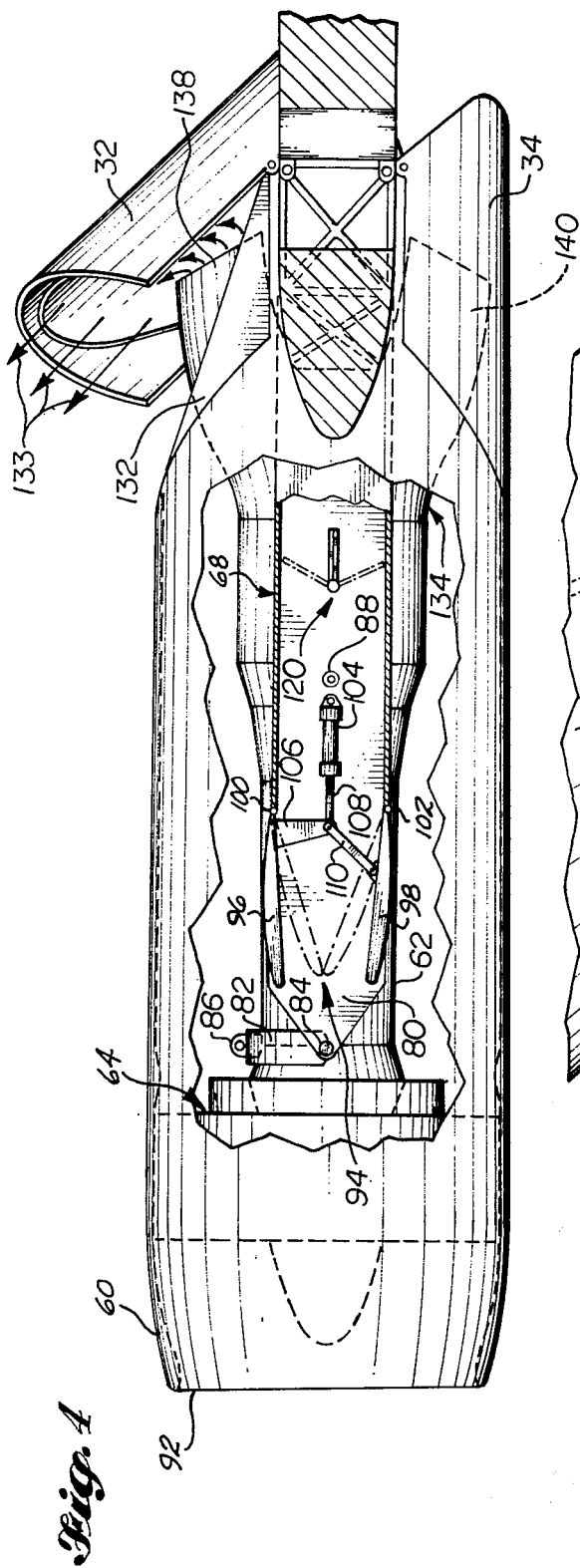
FIG. 4 is an enlarged, partially broken away, elevation view of the apparatus shown in FIG. 3, including the cowl, engine, engine mounting structure, boundary layer control fluid supply apparatus, and thrust reversing mechanisms, the upper portion of which is shown in a reversing position and the lower portion of which is shown in a cruise position.
Figure 5:
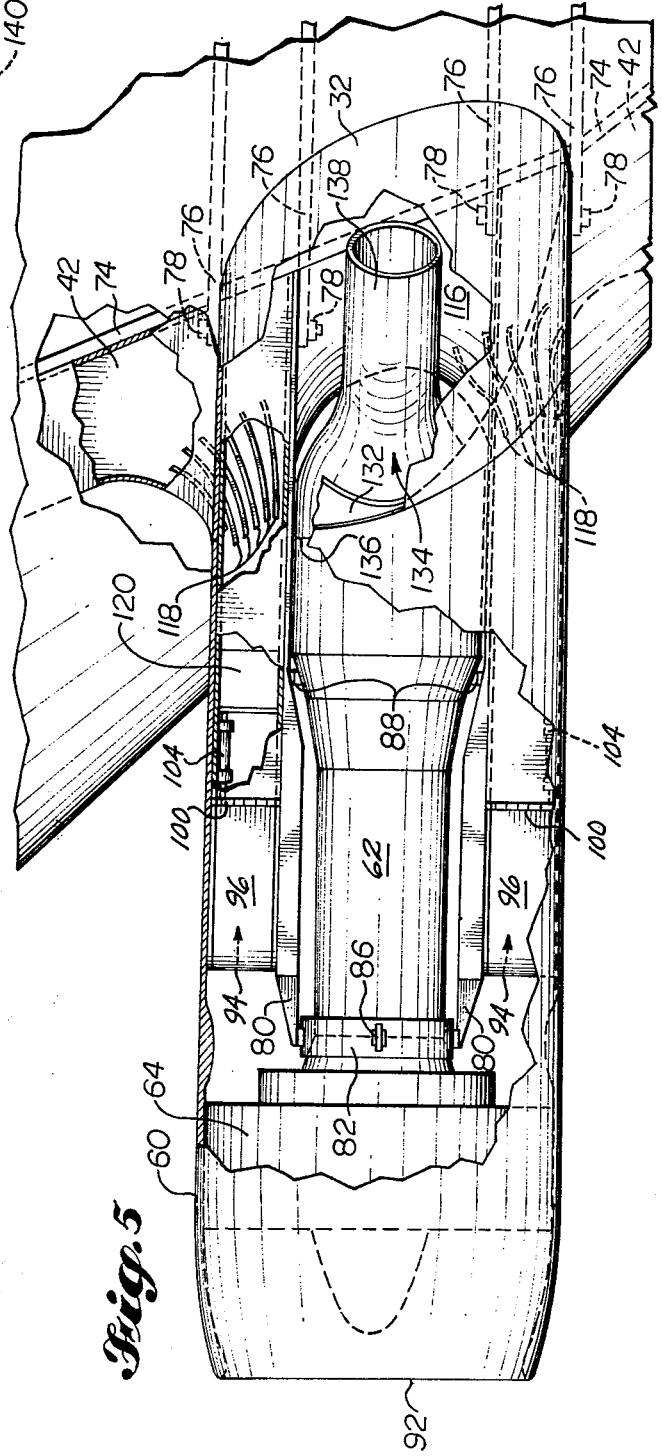
FIG. 5 is a plan view of the structure shown in FIG. 4 with the thrust reversing mechanism shown in the cruise position.

Referring jointly to FIGS. 3, 4, and 5, the cowl 60 is of monocoque construction, or other construction having suitably reinforced, self-supporting walls. The cowl has an annular cross section and is positioned to surround the turbine along its longitudinal dimension. The interior diametral dimension of the cowl is sized to abut the respective, outwardly facing sides of the box beams 68, which are suitably joined to the cowl 60 in a conventional manner by welding, bolting, riveting or other suitable fastening means. If desired, a removable panel section (not shown) can be provided in the cowl so that access to the turbine or to the fan 64 can be had without removal of the entire cowl structure from the wing. This and other such modifications to the overall structure disclosed herein are within the skill of an ordinary artisan.

A low pressure fan is positioned forwardly of the forward ends of the box beams 68 and 69 and rearwardly of the forwardly opening inlet 92 formed in the cowl 60. Air is supplied to both the low pressure fan 64 and to the turbine 62 through this inlet 92. Low pressure air is supplied to the interior channels in both box beams 68 through channel inlets 94, provided at the forward end of the box beams. The channel inlets 94 are formed by the forward vertical edges of the side panels of the box beams and by two inlet doors 94 and 98 positioned between the forward portions of the sidewalls of the box beams, forming forward extensions of the top and bottom walls of the box beams. The inlet doors are pivotally mounted at their rearward ends to the forward edges of the top and bottom walls by hinges 100 and 102, respectively. The hinge axes of hinges 100 and 102 are laterally oriented relative to the box beams and are parallel to each other. The upper doors 96 are mounted to swing downwardly from an open position in forwardly extending alignment with the upper channel wall to a closed position wherein the forward ends of the doors 96 are located in the central forward portion of the box beams 68 and 69. Likewise, the bottom doors 98 are mounted to swing from an open position in forwardly extending alignment with the bottom channel wall of the box beams 68 and 69 to an open position wherein the forward edges of the doors 98 are positioned in the central forward portions of the box beams. The forward edges of the doors 96 and 98, are configured so as to mate with each other when the doors are in a closed position to form a forward edge seal, as shown in dotted outline in FIG. 4. When the doors are closed, fan air is prevented from entering the interior channels in the box beams 68 and 69.

The upper and lower doors 96 and 98 associated with each of the box beams 68 and 69 are actuated between the open position and closed position by a suitable actuating apparatus. The actuating apparatus will be described in relation to the outboard box beam 68, although it is to be understood that a similar actuating apparatus is associated with the inboard box beam 69. The actuating apparatus includes a suitable pneumatic or hydraulic actuator 104, the cylinder of which is pivotally mounted to an interior side wall of the box beam. An upper arm 106 is affixed to the bottom rearward portion of the upper door 96 and extends downwardly therefrom adjacent to the interior of the same wall of the box beam 68. The piston rod 108 of the pneumatic actuator is pivotally attached to the upper arm 106 at a location between the upper and lower walls of the box beam. One end of a link 110 is pivotally attached to a flange provided on the upper rearward surface of the lower door 98 and the other end of the link is pivotally attached to the upper arm 106 along the same pivotal attachment axis as the piston rod 108. Upon supplying fluid pressure to one side of the piston in the pneumatic actuator 104, the piston arm 108 is retracted, pulling rearwardly on the arm 106 and the link 110. This motion of the arm and link causes the upper and lower doors 96 and 98 respectively to swing about their respective hinges toward each other until the forward edges of the doors engage to close the inlet to the interior channel in the box beam 68. The doors are shown in dot-dash outline in FIG. 4 in the closed position. When the pneumatic actuator 104 is supplied with fluid pressure on the opposite side of its piston, the piston rod 108 is thrust forwardly to the limit of its extension causing the upper and lower doors 96 and 98 to swing in mutually opposing directions until they are positioned in alignment with the upper and lower walls of the box beam 68, thus opening the inlet to the interior channel in the box beams. The actuator 104 can be controlled by suitable control circuitry of conventional design. The doors 96 and 98 can be actuated manually by the pilot, or if desired, can be interconnected for actuation in conjunction with extension and retraction of the leading and/or trailing edge flaps.

Referring still to FIGS. 3, 4 and 5, boundary layer control fluid supply plenums 42 (schematically shown in FIG. 2) are located in the wing on each side of the engine mounting structure. The fluid supply plenums can be of any desired configuration, but are depicted as having a rectangular cross section. The supply plenums extend substantially spanwise along the wing adjacent to and rearwardly of the leading edge. The supply plenums terminate in openings on each side of the location of the outside walls of the box beams 68 and 69 when in position on the wing. The exterior, outwardly facing side walls of the box beams 68 and 69, contain corresponding openings that are aligned with the openings in the supply plenums. The inwardly facing, mutually opposing side walls of the box beams terminate short of the rearward end of the box beams to form openings, which in turn communicate with the hollow interior of a fan air bifurcator 116. The fan air bifuractor 116 is affixed to and extends forwardly from the forward main spar of the wing between the location of the two box beams. When the inlet doors 96 and 98 are in an open position, fan air generated by the low pressure fan is forced rearwardly through the annular fan channel formed between the turbine 62 and the interior of the cowl 60. A portion of that air passes into the inlets 94 to the interior channel in the box beams and travels rearwardly through the box beams 68 and 69. In normal operation, the fan air continues rearwardly to the rearwardly extending portions of the box beams 68 and 69. The fan air traveling rearwardly through the box beams exits from the openings in the box beams and enters the supply plenums and the interior of the fan air bifurcator 116.

Suitable turning vanes 118 are provided to assist in turning the fan air into the hollow interior of the bifurcator 116 and into the respective inboard and outboard sections of the boundary layer control fluid supply ducts 42. Certain of the turning vanes 118 extend from the interior of the box beams into the interior of the bifurcator 116 and into the interior of the supply ducts 42. These turning vanes are formed in two segments having mating, vertically oriented joints positioned along the outer edge of the side truss members of the box beams to facilitate removal and placement of the box beams. The respective segments are fixed to the structure in which they are respectively located. The remaining turning vanes are located entirely within the box beams and are affixed thereto.

Figure 10:
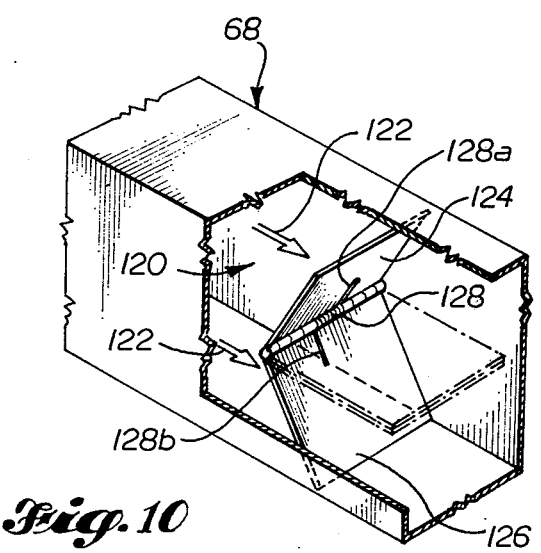
FIG. 10 is an enlarged partially broken away isometric view of a boundary layer control fluid supply duct in accordance with the present invention, having the truss member of the box beam omitted for clarity and showing a check valve mechanism in the duct.

Should under extraordinary circumstances either the starboard or port engine cease to operate, the remaining operative engine can supply boundary layer control fluid to the wing carrying the inoperative engine through the interconnecting supply duct 50 (FIG. 2). When one engine is supplying boundary layer control air to both wings, some of the control air will tend to exhaust through the interior channels of the box beams supporting the inoperative engine. To prevent this occurrence, a check valve mechanism, generally designated 120, is provided in each of the box beams. The check valve mechanism 120 is best shown in FIG. 10, an isometric view of one of the box beams 68 with its truss members omitted for clarity. The normal flow of fan air from the fan duct to the supply ducts is in the direction indicated by the arrows 122. The check valve mechanism includes two doors 124 and 126 that are mounted to swing about a hinge having its axis positioned laterally relative to the longitudinal dimension of the box beams. The hinge axis is also positioned substantially intermediate the upper and lower walls of the box beam 68. The doors 124 and 126 are substantially rectangular in cross section and are sized so that they are slightly larger than one-half of the rectangular cross section of the interior channel of the box beam. The doors are designed to swing rearwardly toward each other to an open position where the doors are aligned in parallel relationship with the upper and lower walls of the box beam. A coil spring 128 is suitably mounted about the hinge supporting the doors 124 and 126. Spring arms 128a and 128b, integral with the ends of spring and extending radially away from the hinge axis, bear against respective rearwardly facing surfaces of the doors 124 and 126. The spring arms bias the doors 124 and 126 in mutually opposing directions to a closed position wherein the top edge of the top door 124 opposite the hinged edge and the bottom edge of the bottom door 126 opposite the hinged edge abut respectively against the inner surfaces of the upper and lower walls of the box beam 68. Suitable seals (not shown) are provided along the top, bottom and side edges of the doors 124 and 126 so that the doors can engage the walls of the box beam in sealing relationship. The torque of the biasing spring 128 is determined so that the force of the fan air against the forwardly facing surfaces of the doors will cause the doors to assume their first position in parallel relationship with the upper and lower walls of the box beam. When the fan air ceases to flow through the interior of the box beams 68, the force exerted by the arms of the biasing spring 128 on the rearwardly facing surfaces of the doors will cause them to swing to their second position to engage the interior sidewalls of the box beam in sealing relationship. Since the doors are sized slightly greater than one-half of the cross section of the interior of the box beam, they cannot assume a vertical orientation in their second position, but are canted rearwardly from the hinge axis when biased to their second position. Should an engine fail, fan air supplied to the boundary layer control ducts from the operative engine will tend to flow forwardly through the interior of the box beam in a direction opposite to that indicated by arrows 122, at the same time increasing the fluid pressure rearwardly of the doors. This increase in fluid pressure will cause the doors to bear tightly against the interior walls of the box beams preventing escape of fluid through the inlets 94 to the box beams. Thus, the doors function as an effective check valve to maintain effective boundary layer control fluid pressure in the supply ducts when fluid is being supplied by only one engine.

Referring again to FIGS. 4 and 5, the sides of the rearward portion of the cowl 60 are contoured to engage and fair into the leading edge and the upper and lower airfoil surfaces of the wing 12 when the engine is installed on the wing. The upper rearward portion of the cowl extends in a substantially semi-cylindrical configuration from the outboard side of the cowl upwardly and inwardly to the central portion of the cowl, and then downwardly and inwardly toward the inboard side of the cowl. A fairing 132 is fixed to and extends longitudinally rearwardly from the upper rearward portion of the cowl. The fairing has an opening that opens rearwardly and upwardly from the upper airfoil surface. In plan view the rearward edge of this opening is generally parabolic in shape, extending from the outboard rearward terminus of the cowl adjacent to the airfoil surface forwardly and inwardly to a point rearwardly of and adjacent to the central, upper, rearward portion of the cowl and thereafter rearwardly and inwardly to the inboard rearward terminus of the cowl.

An exhaust reversing bucket 32 is mounted on flanges provided on the wing structure above the forward main spar for pivotal movement between first and second positions. In the first position the bucket 32 forms a rearward extension of the cowl 60 and is generally semicircular in cross section. The inner surface of the cowl contains a recess that accepts the fairing 132 to provide a smooth inner wall transition between the fixed cowl and the bucket 32. The rearward edge portion of the bucket 32 defines an opening which opens rearwardly above the upper airfoil surface of the wing 12 to form a semicircular exhaust nozzle. This exhaust nozzle directs the fan air, as well as assists in directing the turbine exhaust as will be explained later, in a rearward chordwise direction across the upper airfoil surface. In the second position, the rearward edge portion of the bucket is swung downwardly and rearwardly to engage the upper airfoil surface of the wing 12. Simultaneously, the forward portion of the bucket is swung upwardly and rearwardly to expose the opening in the fairing 132. In the second position, the bucket 32 provides a blocking surface upon which the exhaust stream from the engine impinges to divert the exhaust stream in an upper upward and forward direction for thrust reversal.

The hinge points for the reversing bucket 32 are located adjacent to the rearward terminus of the outboard and inboard sides of the cowl 60, forming a hinge line that extends rearwardly and outwardly relative to the longitudinal center line of the aircraft. As the bucket 32 is pivoted to its thrust reversing position (the second position) about this hinge line, the exhaust stream is diverted not only upwardly and forwardly but also slightly outwardly. In this manner, the reversed exhaust stream is directed away from the aircraft to prevent it from impinging upon and causing damage to the fuselage of the aircraft.

Only the upper reversing bucket 32 has been described above. It will be readily apparent to those of ordinary skill in the art that the lower bucket 34 and the lower rearward portion of the cowl 60 are mirror images of the upper bucket and upper rearward portion of the cowl relative to the longitudinal, horizontal center plane of the cowl 60. As shown in FIG. 4, the upper bucket 32 is shown in its thrust reversing position to direct the exhaust gases from the engine upwardly, forwardly and outwardly relative to the aircraft along a path indicated by the arrows 133. When the lower reversing bucket 34 is in its thrust reversing position, the lower portion of the exhaust stream is diverted in a downward, forward and outward direction (as depicted by arrows 36' in FIG. 1). In FIG. 4, the lower bucket 34 is shown in a cruise position wherein it forms a rearward extension of the cowl 60. Although the aircraft would not normally be operated with the upper bucket in the thrust reversing position and the lower bucket in the cruise position, the structure was depicted in this manner to simplify the explanation. In actual operation, both of the buckets 32 and 34 would be simultaneously actuated to reside in either the cruise position (exemplified by lower bucket 34) or the thrust reversing position (exemplified by upper bucket 32).

Referring now to FIGS. 4, 5, 6, 8 and 9, a turbine exhaust nozzle 134 is fixed to and extends rearwardly from the turbine 62. The forward portion of the exhaust nozzle 134 is joined to the rearward portion of the turbine 62 in a conventional manner along joint 136. The forward portion of the exhaust nozzle 134 has a substantially circular cross section and has a central portion that enlarges in cross section for a short distance as it extends rearwardly from the joint 136. A Y-shaped outlet pipe is located rearwardly of and extends rearwardly from the central portion of the exhaust nozzle. The upper and lower branches of the Y-shaped outlet pipe, designated 138 and 140 respectively, bifurcate the turbine exhaust stream traveling rearwardly through the forward and central portions of the turbine nozzle. The upper branch 138 of the Y-shaped outlet pipe extends upwardly and rearwardly from the central portion of the nozzle and terminates in a rearward opening 142 at a location forwardly of the upper cowl exhaust outlet formed by the upper bucket 32. The upper branch of the outlet pipe directs the portion of the turbine exhaust flowing therethrough in a rearward direction chordwise across the upper airfoil surface of the wing 12. The path of the upper portion of the turbine exhaust is indicated by the arrows 144. The lower branch of the Y-shaped outlet pipe 140 extends downwardly and rearwardly from the central portion of the turbine nozzle 134 and terminates in a rearward opening 146 at a location forwardly of the lower cowl exhaust outlet formed by the lower bucket 34. The lower branch 140 of the outlet pipe directs the remaining portion of the turbine exhaust traveling therethrough rearwardly and chordwise across the lower airfoil surface of the wing 12. The path of the lower turbine exhaust is indicated by arrows 148.

Figure 7:
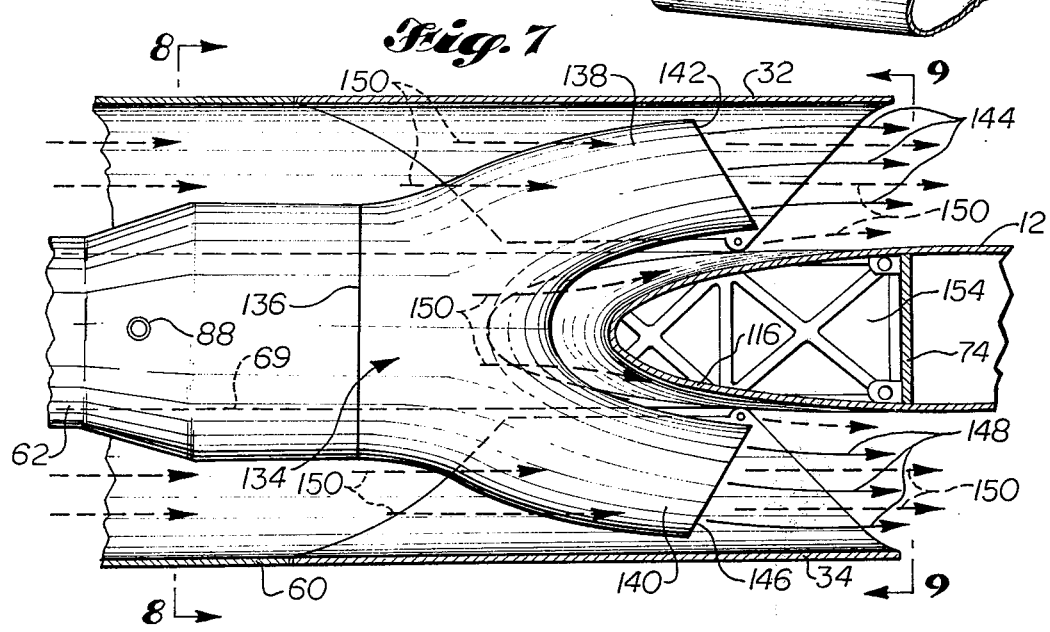
FIG. 7 is a view in partial longitudinal section of the rearward portion of the apparatus illustrated in FIG. 4 showing the turbine and fan nozzle structure.
Figure 8:
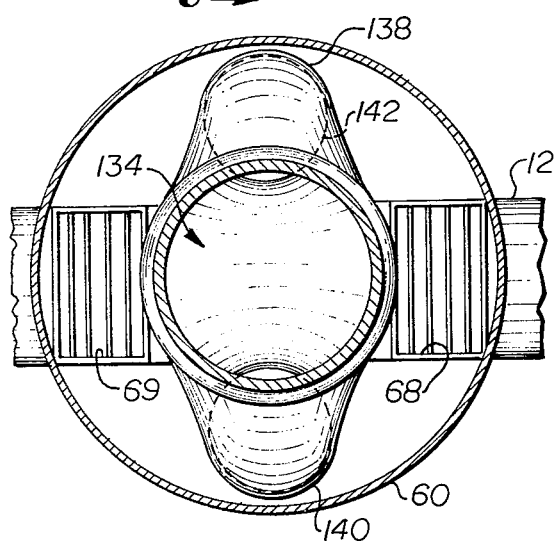
FIG. 8 is a cross-sectional view of the apparatus taken along section line 8—8 of FIG. 7.
Figure 9:
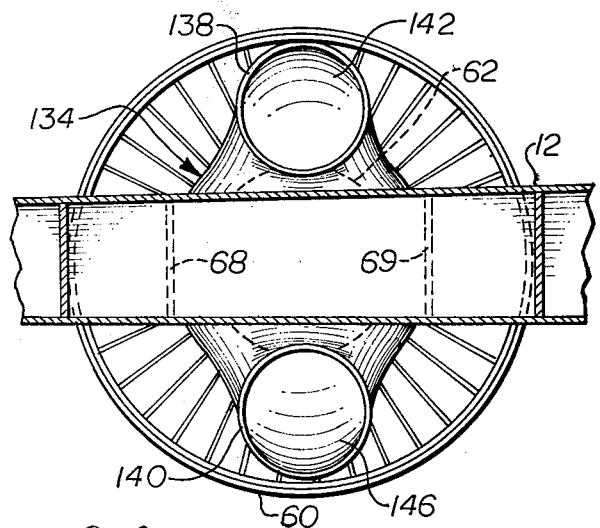
FIG. 9 is a cross-sectional view of the apparatus taken along section line 9—9 of FIG. 7.

The rearward openings 142 and 146 of the upper and lower branches of outlet pipes 138 and 140 have a substantially smaller cross section than the respective upper and lower rearward openings formed by the cowl 60. As indicated in FIG. 7, the fan air surrounds and travels past the branches of the outlet pipe along a path designated by the dashed arrows 150. The fan air flows past the turbine exhaust nozzle 134 and the upper and lower branches of the outlet pipes 138 and 140 to cool them, thereby preventing thermal radiation damage to the interior of the cowling and to the forward portion of the wing adjacent the engine installation. Also, the fan air traveling rearwardly from the upper and lower cowl exhaust nozzles surrounds the turbine exhaust traveling rearwardly from the respective upper and lower branches of the outlet pipes 138 and 140 to muffle the turbine exhaust and to position a layer of relatively cool fan air between the wing surfaces and the turbine exhaust stream.

Figure 6:
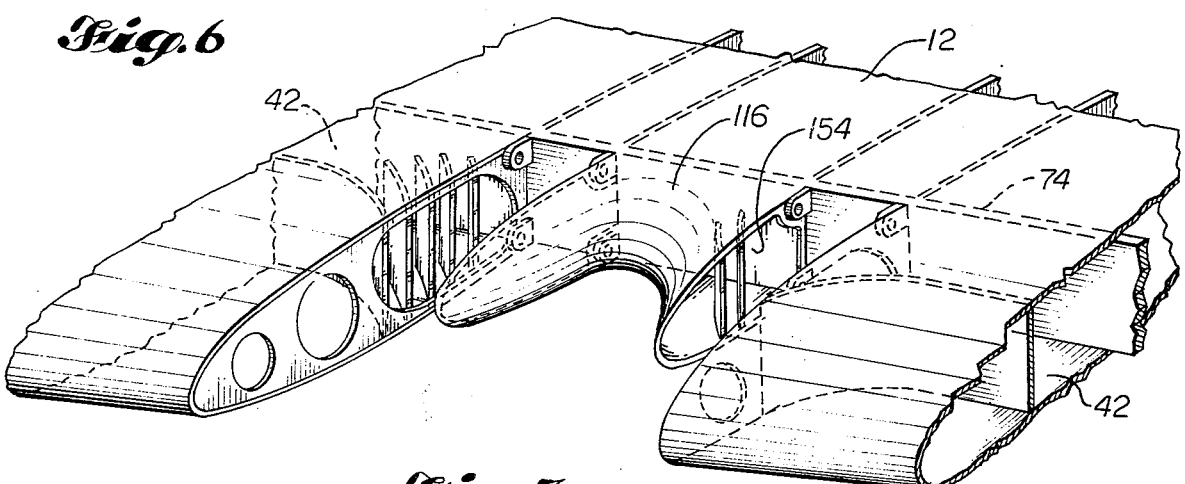
FIG. 6 is an isometric view of the wing with the integrated portions of the cowl, engine, support structure and boundary layer control fluid supply system removed to show the fan air bifurcation structure, the boundary layer control plenum structure, and the spar attachment structure.

The fan air bifurcating structure 116, best shown in FIG. 6, serves to divide the fan air stream into upper and lower portions. The bifurcating structure is mounted between the interior mounting locations of the two box beams 68 and 69 (removed for illustrative clarity in this view). The interior of the bifurcating structure contains a channel 154 that places the interiors of the rearward portion of the two box beams and thus the inboard and outboard boundary layer control fluid ducts in fluid communication as described above. The fan air bifurcator is affixed to the forward main spar 74 of the wing via the attachment flanges on which the box beams are mounted. The bifurcator extends forwardly from the spar, having a vertical dimension at its rearward portion adjacent the spar 74 that corresponds to the camber of the wing. The forward portion of the fan air bifurcator extends forwardly from the spar to a forward terminus rearwardly of the leading edge of the wing. In plan view, the forward portion of the fan bifurcator has a central, forwardly opening, rearwardly extending recess. From the central portion of this recess, the exterior walls of the fan bifurcator extend in mutually opposing directions in a compound curve to merge into the upper and lower surfaces of the wing 12. When the engine structure is in position, as shown in FIG. 7, the central portion of the Y-shaped outlet pipe extends into the recess in the fan air bifurcator, while being spaced from the walls of the recess. Fan air can thus flow between the turbine nozzle and outlet pipe to cool the surface walls of the bifurcator.

In summary, the midwing, close-coupled engine configuration of the present invention has an unique arrangement and construction heretofore not known in the art. The positioning of the engines in a forward extension of the chordal plane of the wing and in close proximity to the major structural members of the wing yields several advantages. Paramount of these is the elevation of the engine relative to the wing structure as compared to conventional pod-mounted engines. This feature provides a low or midwing aircraft with low ground profile, allowing the use of relatively short landing gear without increasing the incidence of ingestion of ground debris into the engine. Aside from permitting the use of shorter, stronger and mechanically simpler retractable landing gear, the fuselage is in a close proximity to the ground, greatly increasing accessibility to cargo and/or passenger decks to facilitate loading and unloading without the use of special equipment. An advantage of mounting the engine on rearwardly extending frame members is the elimination of an exterior strut assembly necessarily employed with pod-mounted engines. Elimination of the strut reduces frontal area and consequently aerodynamic drag, and yields a significant weight reduction in the engine installation.

By mounting the engine forwardly of the wing and orienting it so that it is bisected by the chordal plane, the thrust reversers, which are normally integrally connected with the engine and cowl structure through complicated linkages and actuators, can be mounted directly on the wing. This reverser installation permits a lighter weight cowl and mounting structure to be employed since the reverser loading can be transferred directly to the wing skeleton, as opposed to being transferred through an intermediate structural member such as as strut. Further, the upper and lower thrust reversing buckets can be independently removed for maintenance or replacement. Moreover, the reverser actuators and linkages can be housed in the wing adjacent to the reversing device to permit simplification of the actuating mechanism with a concomitant weight reduction and increase in reliability. The simplified engine mounting structure of the present invention also provides ease of accessibility for servicing, maintenance and replacement of the engines.

The entire engine and forward portion of the cowl assembly can be removed in a very short period of time by removing the four mounting bolts securing the box beams to the forward main spar of the wing.

From the in-flight safety standpoint, the midwing, close-coupled engine installation, provides adequate ground clearance to eliminate the potential of engine damage or fire hazard resulting from engine contact with the runway when encountering a severe roll maneuver on take-off or landing. An additional safety feature inherent in the midwing mounting of the engine forward of the leading edge is elimination of the possibility of wing and wing fuel tank damage should a turbine compressor or low pressure fan disintegrate.

In another aspect, the proximity of the engine to the wing is particularly convenient for providing structure to supply boundary layer control fluid to the wings. With conventional pod-mounted engines, elaborate valves and ducting must be employed to bleed air from the engine and route it through the nacelle, strut and into the supply plenum. In the present invention, fan air is bled from the engine immediately behind the low pressure fan and is ducted in a straight line rearwardly through the channels in the box beams directly into the supply plenums, causing little or no pressure loss in the supply system. In addition, relatively simple valving mechanisms can be employed to open or close the inlet to the interior of the box beams, while a relatively simple check valve can be used to prevent blow-back through the box beams.

The present invention has been described in relation to a preferred embodiment. One of ordinary skill in the art, after reading the foregoing specification, will be able to effect various changes, alterations, and substitutions of equivalents without departing from the broad concepts disclosed herein. For example, if only the boundary layer control supply feature of the present invention is to be employed, different structural mounting means can be employed. Likewise, mounting structure of reduced cross section can be substituted for the box beams disclosed in the preferred embodiment should it be desired to eliminate the boundary layer control fluid supply system. In view of the foregoing, it is intended that the scope of the present invention be limited only by the definition contained in the appended claims.

What is claimed is:

1. In an apparatus including a turbofan jet propulsion engine and an airfoil, said airfoil having a span, a leading edge, a trailing edge, a chordal plane, and first and second airfoil surfaces located on opposite sides of said chordal plane, said turbofan engine including turbine means for generating a first propulsive gas stream and fan means for generating a second propulsive gas stream, said turbine means being operatively coupled to drive said fan means, the improvement comprising:

cowl means for enclosing and supporting said turbofan engine, said cowl means having a forward portion located forwardly of the leading edge of said airfoil and having a rearward portion fixed to said airfoil, said forward portion being bisected by said chordal plane, said cowl means including means for mounting said turbofan engine in said forward portion of said cowl means, said cowl means having an inner surface spaced outwardly from said turbine means to define an annularly shaped fan duct therebetween, said forward portion of said cowl means terminating in a forwardly opening air intake for supplying air to said fan means and said turbine means, the rearward portion of said cowl means terminating in first and second nozzle means, said first nozzle means for directing a portion of said second propulsive gas stream from said fan means rearwardly in a chordwise direction across said first airfoil surface, said first nozzle means being positioned rearwardly from said leading edge, said second nozzle means for directing a portion of said second propulsive gas stream from said fan means rearwardly in a chordwise direction across said second airfoil surface, said second nozzle means being positioned rearwardly from said leading edge, said fan duct communicating with said first and second nozzle means to supply fan air thereto, means for mounting said cowl means on said airfoil, and turbine nozzle means coupled to said turbine means for receiving said first propulsive gas stream from said turbine means, bifurcating said first propulsive gas stream into first and second portions, and for directing said first and second portions of said first propulsive gas stream through respective ones of said first and second exhaust nozzles and rearwardly in a chordwise direction across respective ones of said first and second airfoil surfaces, said first and second nozzles being so oriented and constructed so as to direct respective portions of said first propulsive gas stream through the central portion of respective ones of said first and second exhaust nozzles, the portions of said second propulsive gas stream thereby surrounding respective portions of said first propulsive gas stream to shield said airfoil from said first propulsive gas stream.

2. In the apparatus of claim 1, said means for mounting said turbofan engine in said forward portion of said cowl means comprising:

first and second structural beams, said first and second beams being fixed to said turbine means on respectively opposite sides thereof and extending longitudinally rearwardly along said sides of said turbine means from a location in said cowl means rearward of said fan means, said first and second beams being fixed to mutually opposing sides of said cowl means and being so constructed to position said turbine means at a location spaced inwardly from said inner surface of said cowl means, and said first and second beams being the major structural supporting elements for said turbine means.

3. In the apparatus of claim 2 where said airfoil has a primary forward structural spar, said means for mounting said cowl means on said airfoil comprising:

first and second beam extensions fixed to and extending rearwardly from respective ones of said first and second beams, and means for removably fixing said first and second beam extensions to said primary forward spar at spaced locations on said spar.

4. In the apparatus of claim 1, said airfoil having a boundary layer control fluid supply plenum therein, said improvement further comprising:
   means defining a first duct located in said annular fan duct, said first duct having an inlet positioned rearwardly from said fan means and forwardly from said airfoil to receive a portion of said second propulsive gas stream flowing from said fan means, said first duct extending rearwardly from said inlet toward said airfoil,
   means placing said first duct in fluid communication with said supply plenum in said airfoil, and
   means for opening and closing said first duct to fluid flow.

5. In the apparatus of claim 4, the improvement further comprising:
   check valve means located in said first duct and being operative to allow fluid flow from said inlet toward said supply plenum and to prevent fluid flow from said supply plenum toward said inlet.

6. In the apparatus of claim 1, said turbine nozzle means comprising:
   a forward duct portion having an outlet and having an inlet, said inlet communicating with said turbine means to receive said first propulsive gas stream from said turbine means, said forward duct portion being bisected by said chordal plane,
   a first rearward duct portion communicating with a portion of the outlet of said forward duct portion, said first rearward duct portion extending rearwardly from said forward duct portion and extending away from one side of said chordal plane, said first rearward duct portion terminating in an opening for directing said first portion of said first propulsive gas stream rearwardly across said first airfoil surface, and
   a second rearward duct portion communicating with the remaining portion of the outlet of said forward duct portion, said second rearward duct portion extending rearwardly from said forward portion and extending away from the other side of said chordal plane, said second rearward duct portion terminating in an opening for directing said second portion of said first propulsive gas stream rearwardly across said second airfoil surface, said forward and said first and second rearward ducts being spaced inwardly from said cowl means and from said airfoil so as to allow said second propulsive gas stream to completely surround said duct portions as said second propulsive gas stream flows toward said first and second nozzle means.

7. In the apparatus of claim 6, said opening of said first rearward duct portion being positioned within said first nozzle means to direct said first portion of said first propulsive gas stream into the portion of said second propulsive gas stream being directed rearwardly by said first nozzle means, thereby causing said first portion of said first propulsive gas stream to be separated from said first airfoil surface by a portion of said second propulsive gas stream being directed rearwardly by said first nozzle means, said opening of said second rearward duct portion being positioned within said second nozzle means to direct said second portion of said first propulsive gas stream into the portion of said second propulsive gas stream being directed rearwardly by said second nozzle means, thereby causing said second portion of said first propulsive gas stream to be separated from said second airfoil surface by a portion of said second propulsive gas stream being directed rearwardly by said second nozzle means.

8. In an apparatus including a turbofan jet propulsion engine and an airfoil, said airfoil having a span, a leading edge, a trailing edge, a chordal plane, and first and second airfoil surfaces located on opposite sides of said chordal plane, said turbofan engine including a turbine means for generating a first propulsive gas stream and fan means for generating a second propulsive gas stream, said turbine means being operatively coupled to drive said fan means, said airfoil having a boundary layer control fluid supply plenum therein, the improvement comprising:
   cowl means for enclosing said turbofan engine, said cowl means having a forward portion located forwardly of the leading edge of said airfoil and having a rearward portion fixed to said airfoil, said cowl means including means for mounting said turbofan engine in said forward portion of said cowl means, said cowl means having an inner surface spaced outwardly from said turbine means to define an annularly shaped fan duct therebetween, said forward portion of said cowl means terminating in a forwardly opening air intake for supplying air to said fan means and said turbine means, the rearward portion of said cowl means terminating in a fan nozzle means for directing at least a portion of said second propulsive gas stream from said fan means rearwardly in a chordwise direction across said first airfoil surface, said fan duct communicating with said fan nozzle means to supply fan air thereto, said fan nozzle means being positioned rearwardly from said leading edge,
   means for mounting said cowl means and said engine in cantilevered relationship forwardly of and on said airfoil,
   turbine nozzle means coupled to said turbine means for receiving said first propulsive gas stream from said turbine means and for directing at least a portion of said first propulsive gas stream through said fan exhaust nozzle rearwardly in a chordwise direction across said first airfoil surface,
   means defining a first auxiliary duct located in said annular fan duct, said auxiliary duct having an inlet positioned rearwardly from said fan means and forwardly from said airfoil to receive a portion of said second propulsive gas stream flowing from said fan means, said auxiliary duct extending rearwardly from said inlet toward said airfoil,
   means placing said auxiliary duct in fluid communication with said fluid supply plenum in said airfoil and
   means for opening and closing said auxiliary duct to fluid flow therethrough.

9. In the apparatus of claim 8, the improvement further comprising:
   check valve means located in said auxiliary duct and being operative to allow fluid flow from the inlet thereof to said fluid supply plenum.

10. In an apparatus including a turbofan jet propulsion engine and an airfoil, said airfoil having a span, a leading edge, a trailing edge, a chordal plane, and first and second airfoil surfaces located on opposite sides of said chordal plane, said turbofan engine including turbine means for generating a first propulsive gas stream and fan means for generating a second propulsive gas stream, said turbine means being operatively coupled to drive said fan means, the improvement comprising:

cowl means for enclosing and supporting said turbofan engine, said cowl means having a forward portion located forwardly of the leading edge of said airfoil and having a rearward portion fixed to said airfoil, said forward portion being bisected by said chordal plane, said cowl means including means for mounting said turbofan engine in said forward portion of said cowl means, said cowl means having an inner surface spaced outwardly from said turbine means to define an annularly shaped fan duct therebetween, said forward portion of said cowl means terminating in a forwardly opening air intake for supplying air to said fan means and said turbine means, the rearward portion of said cowl means terminating in a first and second nozzle means, said first nozzle means for directing a portion of said second propulsive gas stream from said fan means rearwardly in a chordwise direction across said first airfoil surface, said first nozzle means being positioned rearwardly from said leading edge, said second nozzle means for directing a portion of said second propulsive gas stream from said fan means rearwardly in a chordwise direction across said second airfoil surface, said second nozzle means being positiond rearwardly from said leading edge, said fan duct communicating with said first and second nozzle means to supply fan air thereto, turbine nozzle means coupled to said turbine means for receiving said first propulsive gas stream from said turbine means, bifurcating said first propulsive gas stream into first and second portions, and for directing said first and second portions of said first propulsive gas stream through respective ones of said first and second exhaust nozzles and rearwardly in a chordwise direction across respective ones of said first and second airfoil surfaces, first and second structural beams, said first and second beams being fixed to said turbine means on respectively opposite sides thereof and extending longitudinally rearwardly along said sides of said turbine means from a location in said cowl means rearward of said fan means, said first and second beams being fixed to mutually opposing sides of said cowl means and being so constructed to position said turbine means at a location spaced inwardly from said inner surface of said cowl means, and said first and second beams being the major structural supporting elements for said turbine means, a boundary layer control fluid supply plenum located in said airfoil, said first and second beams each including means defining a passage therein, said passages running longitudinally within each of said beams and having an inlet positioned rearwardly of said fan means to receive a portion of said second propulsive gas stream, said passages running rearwardly from said inlet and being in fluid communication with said supply plenum, and means associated with each of said first and second beams for controlling the flow of fluid through said passage to said plenum.

11. In the apparatus of claim 10, each of said first and second beams comprising a box structure having walls enclosing the longitudinal sides of said box structure to form said passage in the interior of said box structure, the forward termini of said walls defining a rectangular opening to form said inlet, said inlet having a top and a bottom, said means for controlling the flow of fluid comprising an upper door, means pivotally mounting the rearward portion of said upper door on said box structure adjacent to the top of said inlet so that the forward portion of said upper door is mounted for swinging movement in a vertical direction, a lower door, and means pivotally mounting the rearward portion of said lower door on said box structure adjacent to the bottom of said inlet so that the forward portion of said lower door is mounted for swinging movement in a vertical direction, said upper and lower doors having forward edges capable of mutual engagement when said upper and lower doors are swung toward each other to an engagement position to thereby close the inlet to said passage, and actuating means for swinging said doors between said engagement position and an open position wherein the forward edges of said upper and lower doors are spaced to thereby open the inlet to said passage.

12. In the apparatus of claim 11, the improvement further comprising:

check valve means mounted in said passage in each of said first and second beams to allow fluid flow through said passage toward said plenum and to prevent flow from said plenum toward said inlet.

13. In the apparatus of claim 12, each of said check valve means comprising:

a pair of door members pivotally mounted in said passage along a common axis, said axis being located between mutually opposing walls of said passage, each of said door members being mounted for swinging movement in mutually opposing directions to a first position wherein one of said door members engages the walls of a portion of the passage on one side of said axis in fluid sealing relationship and wherein the other of said door members engages the walls of a portion of the passage on the opposite side of said axis in fluid sealing relationship to thereby close said passage to fluid flow from said plenum toward said inlet, said door members further being mounted for swinging movement in a rearward direction and toward each other from said first position to a second position wherein said door members are disengaged from said walls to open said passage to fluid flow, said door members being mounted and constructed so as to swing from said first position to said second position responsive to fluid flow in said passage from said inlet toward said plenum, and means for biasing said door members for swinging movement toward said first position.

* * * * *